Oct. 8, 1929.  O. F. KLEEB ET AL  1,730,938
AUTOMATIC SAW MACHINE
Filed Aug. 27, 1927  3 Sheets-Sheet 1

Inventors
Otto F. Kleeb
Henry J. Fullerton
By Philip A. H. Serrell
their Attorney Oct. 8, 1929.　　　O. F. KLEEB ET AL　　　1,730,938
AUTOMATIC SAW MACHINE
Filed Aug. 27, 1927　　　3 Sheets-Sheet 3

Inventors
Otto F. Kleeb and
Henry J. Fullerton
By Philip A. Ferell
their Attorney Patented Oct. 8, 1929

1,730,938

UNITED STATES PATENT OFFICE

OTTO FRED KLEEB AND HENRY JAMES FULLERTON, OF PITTSBURGH, PENNSYLVANIA, ASSIGNORS TO HUNTER SAW AND MACHINE COMPANY, OF PITTSBURGH, PENNSYLVANIA

AUTOMATIC SAW MACHINE

Application filed August 27, 1927. Serial No. 215,842.

The invention relates to automatic saw machines, particularly adapted for sawing metal bars, and has for its object to provide a device of this character wherein the saw is carried by a pivoted frame, and is provided with a slotted arm into which a pin carried by a driven disc extends, and which pin forms means whereby the pivoted saw carrying member is oscillated towards and away from the work.

A further object is to drive the disc through the medium of a gear train from a motor and by changing the size of gears of the train vary the time of operation of the machine.

A further object is to mount the gear train, motor and parts supporting the same slidably on a bed and to provide an adjusting screw whereby said bed may be adjusted to various positions for varying the height of movement of the saw as desired.

A further object is to provide a slidable clamping jaw cooperating with a fixed clamping jaw, a pivoted lever beneath the slidable clamping jaw and having a spring connection with the operating arm of the saw carrying member, whereby upon the starting of the downward movement of the saw the slidable clamping member will be forced towards the fixed clamping member for automatically clamping an article to be sawed.

A further object is to provide a stop at one side of the machine in the path of material placed in the clamp, and which stop is carried by a pivoted lever, one arm of which engages under an adjusting screw carried by the pivoted saw carrying member, and which adjusting screw, upon downward movement of the pivoted saw carrying member, tilts the lever and automatically raises the stop to a position out of the path of the material, which has been severed within the clamp, thereby allowing said severed portion of a bar to be discharged by the operator at the opposite side thereof to the feeding side.

A further object is to provide the pivoted saw carrying member with an adjustable counter weight, whereby the pivoted saw carrying member, the saw and its motor may be counterbalanced for insuring a positive and uniform operation.

A further object is to provide the slidable clamping jaw lever with a spring acting against the spring controlled by the operating lever and forming means whereby said slidable clamping jaw is returned to open position upon the upward movement of the saw.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
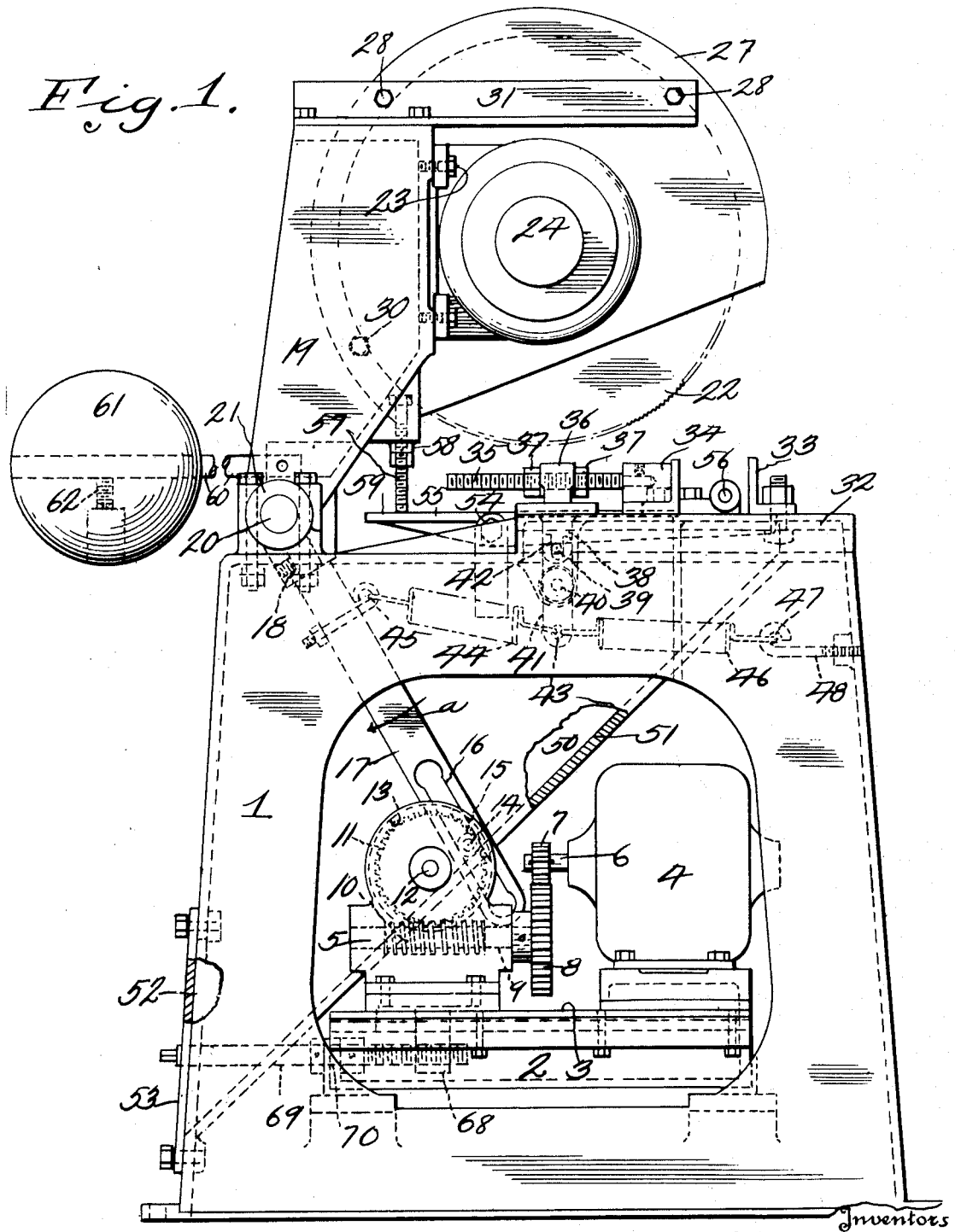
Figure 1 is a side elevation of the machine.
Figure 2:
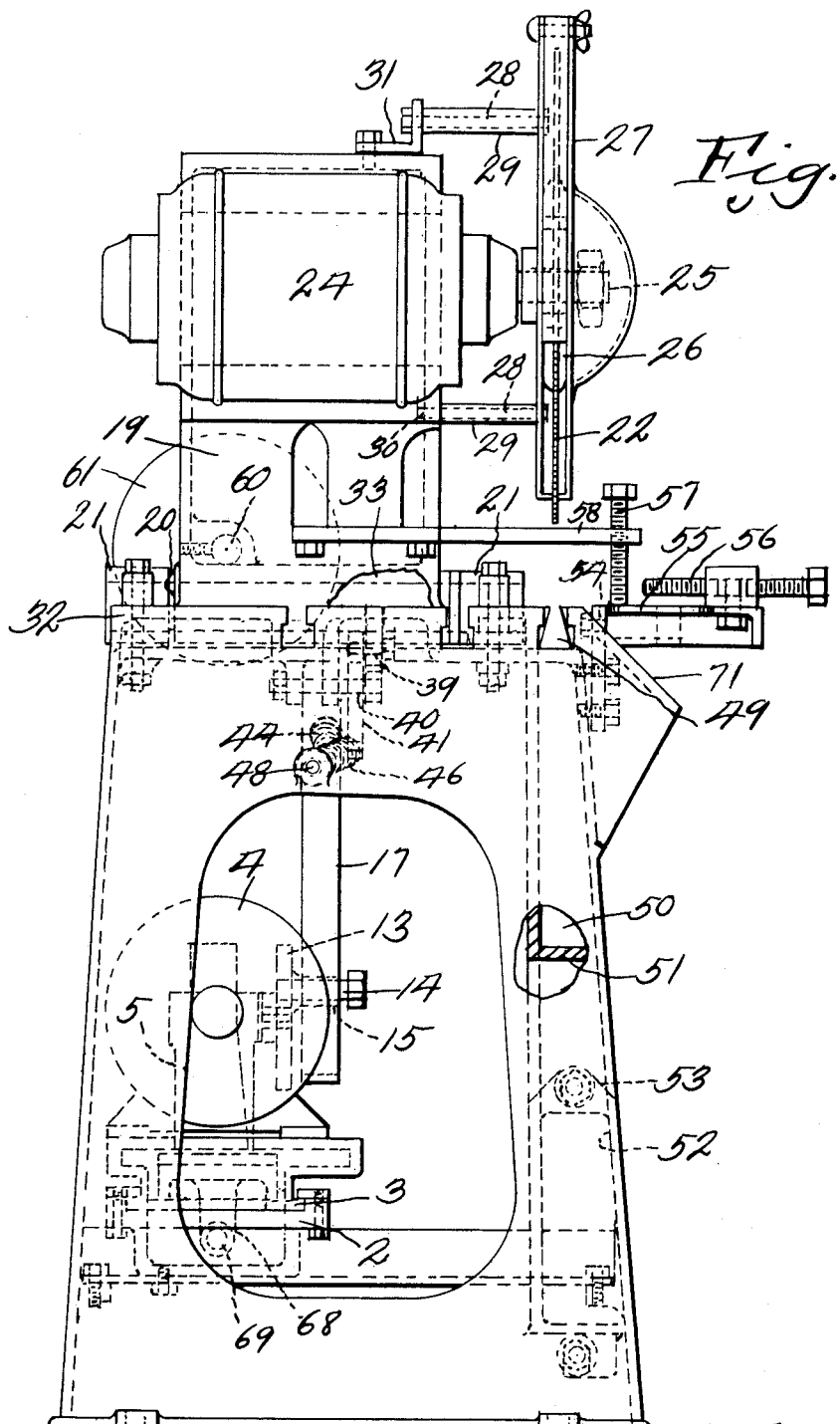
Figure 2 is a front elevation of the machine.
Figure 3:
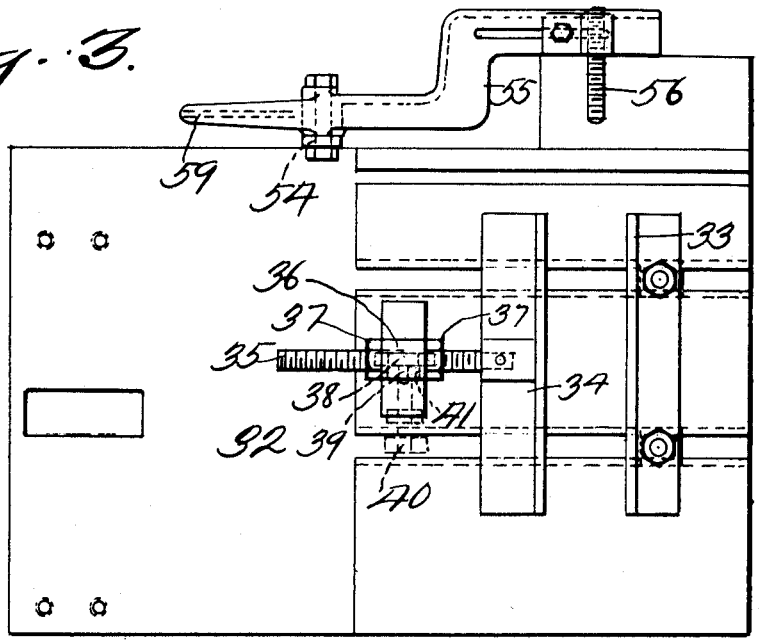
Figure 3 is a top plan view of the bed plate, showing the clamp.
Figure 4:
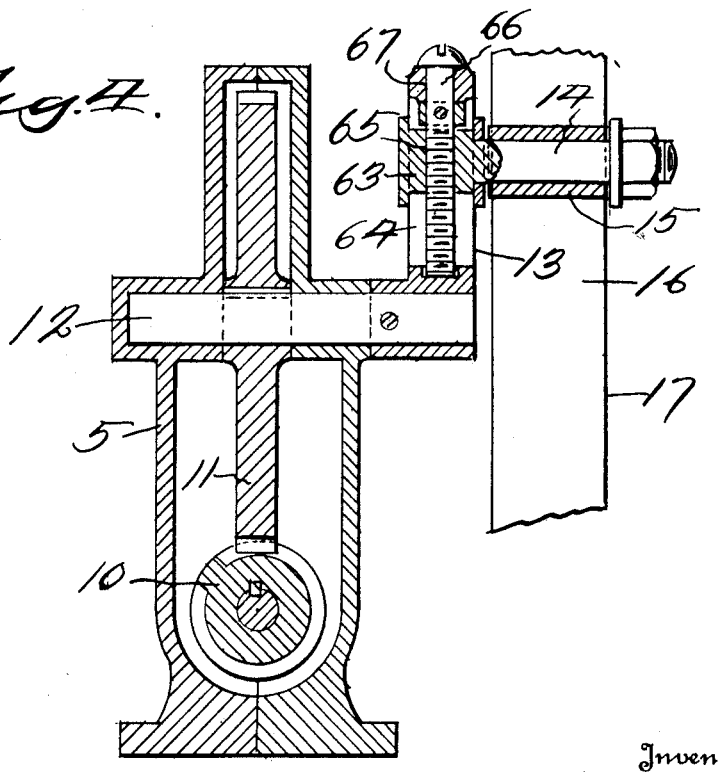
Figure 4 is a sectional view through the gear casing.

Referring to the drawings, the numeral 1 designates the frame of the machine, which frame adjacent its lower end is provided with a horizontally disposed plate 2, on which plate is slidably mounted a member 3, which supports the drive motor 4 and a gear casing 5. The shaft 6 of the drive motor 4 is provided with a drive pinion 7, which meshes with a gear 8 having a shaft 9, which is rotatably mounted in bearings of the gear casing 5. Mounted on the shaft 9 is a worm 10, which worm drives a worm gear 11 within the casing 5, therefore it will be seen that when the motor 4 is in operation, power will be transported through the gearing for rotating the shaft 12, which extends transversely through the casing 5. One end of the shaft 12 is provided with a disc 13 having a pin 14, which is preferably provided with a bearing sleeve 15 and which sleeve and pin extend through the elongated slot 16 in the operating arm 17. The operating arm 17 is connected at 18 to the lower end of the saw carrying frame 19, which frame is pivotally mounted on a shaft 20 carried by the bearings 21 of the upper end of the frame 1, therefore it will be seen that as the disc 13 is rotated through the gear train, the operating lever 17 will be oscillated, and the saw carrying frame 19 will also be oscillated in a downwardly and forwardly extending direction, for moving the rotating saw 22 towards a bar to be severed.

Secured to the forward side of the pivoted frame 19 by means of bolts 23 is an electric motor 24, and which motor has its shaft 25 provided with an arbor or clamp 26 for the saw 22, therefore it will be seen that when the motor 24 is in operation, the saw will be rotated. The saw 22 is provided with a saw guard 27, which saw guard is supported by the bolts 28, which extend through spacing sleeves 29, and are connected to the frame 19 at 30, and to the angle bar 31, bolted to the upper side of the frame 19, therefore it will be seen that the guard is positively supported and the same will move with the saw carrying frame 19 during its oscillation. The motor 24 preferably operates at all times when the machine is operating, however any kind of a control circuit may be used in connection therewith.

Adjustably secured to the bed plate 32 of the frame 1 is a clamping jaw 33, with which a slidable clamping jaw 34 cooperates in a manner whereby upon downward movement of the saw 22, said slidable jaw 34 will be forced towards the jaw 33 for gripping an article between the jaws for holding the same during the cutting operation, for instance a bar of steel. The clamping jaw 34 is provided with a rearwardly extending threaded shaft 35, which extends through a slide block 36 slidably mounted on the bed plate 32 and is provided with nuts 37, which form means whereby the slidable clamping jaw 34 may be adjusted towards and away from the stationary jaw 33 according to the size of bars to be cut. Slide block 36 is provided with a downwardly extending arm 38 having a pin 39, and pivotally mounted at 40 below the bed plate 32 is a lever 41, the upper end of which is provided with a bifurcation 42, in which the pin 39 of the slide block 36 is disposed, therefore it will be seen that upon rocking of the lever 31 in one direction, the slide block and the slidable clamping jaw 34 will be moved towards the stationary clamping jaw 33 for clamping an article, and when rocked in the opposite direction will be moved to a position where the article will be released.

Connected at 43 to the lever 41 is a coiled spring 44, which coiled spring extends rearwardly, and is connected at 45 to the operating lever 17, therefore it will be seen when the lever 17 moves in the direction of the arrow a, Figure 1, said coiled spring 44, will impart a pull on the lower end of the lever 41, thereby forcing the slidable clamping jaw 34 towards the stationary clamping jaw 33 for clamping an article. By providing a coiled spring 44, it is obvious that said spring will stretch to allow the same to accommodate itself to various positions of the clamping jaws, incident to various sizes of materials, and also incident to the adjusted position of the motor 4 and gear train in the casing 5, incident to lowering or raising the limits of the strokes of the saw. Also connected at 43 to the arm 41 is a forwardly extending coiled spring 46, which is connected at 47 to an adjustable bolt 48 carried by the forward side of the frame 1. The spring 46 forms means for insuring a positive movement of the lever 41, and is preferably lighter than the spring 44, so as not to overcome the action of the spring 44, and it also forms means for returning the lever 41 to inoperative position as shown in Figure 1 after the cutting stroke of the saw.

The bed plate 32 adjacent its side is provided with a rearwardly extending saw receiving channel 49 into which the saw 22 extends at the end of the cutting stroke. The channel 49 has its bottom in communication with a chip receiving chamber 50 formed in one side of the frame 1, and which chamber is provided with an inclined bottom 51, down which the chips slide towards a discharge opening 52. The discharge opening 52 is preferably provided with a removable plate 53, which may be removed when it is desired to remove the accumulated chips from the chamber 50.

Pivotally mounted at 54 to one side of the frame 1 is an automatic stop lever 55, the outer end of which is provided with an adjustable stop screw 56, positioned whereby when a bar or rod is placed between the clamping jaws 33 and 34, it will be stopped in a position whereby when the saw 22 moves downwardly, it will sever the bar at a predetermined point for a predetermined length. Upon the initial downward movement of the saw, the bar to be severed is clamped, therefore the stop 56 serves its purpose when the bar is first placed between the clamping jaws, however as the saw moves downwardly the bolt 57 which is carried by a bar 58 mounted on and movable with the saw frame 19 forces downwardly the inner end 59 of the pivoted stop 55, thereby raising the outer end thereof and the bolt 56 to a position whereby the severed piece of the bar will drop downwardly and slide down the inclined surface 71 and be discharged to the side of the machine.

From the above it will be seen that an automatic saw machine is provided, particularly adapted for cutting metal bars, and which machine may be easily and quickly timed for operating at various periods, the height of the ends of the oscillations of the saw varied, and upon the initial movement of the saw a clamping action will take place and an automatic stop raised out of the path of the bar being cut, which stop preferably returns to operative position by gravity.

The saw carrying frame 19 is provided with a rearwardly extending arm 60 on which is adjustably mounted a counterweight 61, which counterweight is preferably provided with a set screw 62, therefore it will be seen that by adjusting the counterweight on its arm, the saw carrying frame may be easily and quickly counter-balanced.

The pin 14 which extends into the slot 16 of the operating arm 17 is provided with a block 63 which is slidably mounted for radial movement in the slot 64 of the member 13, therefore it will be seen that by adjusting the block 63 towards the axis of the shaft 12, the stroke of the saw may be varied. The block 63 has threaded therethrough at 65 a screw 66, which is rotatably mounted at 67 in the member 13, consequently the stroke may be easily and quickly varied.

The plate 3 has its under side provided with a downwardly extending lug 68 through which is threaded a rotatable adjusting screw 69, and which adjusting screw is rotatably mounted at 70 in the base 2, therefore it will be seen that the gear casing 5 and the motor 4 may be easily and quickly adjusted for varying the maximum height of movement of the saw during its oscillation.

The invention having been set forth what is claimed as new and useful is:—

1. The combination with an operating arm of a pivoted saw carrying frame, said frame being pivotally mounted on a base, of means for oscillating said arm, said means comprising a motor, a rotatable disc, a gear train connection between the motor and the rotatable disc, a pin carried by said disc and disposed in an elongated slot in the operating arm, means whereby said motor and gear train may be simultaneously moved to various positions for varying the positions of the ends of the strokes of the operating arm.

2. The combination with a sawing machine comprising a base, an oscillating saw carrying frame, an arm carried by said frame and inclining downwardly into the base, driving means for oscillating said arm, a fixed clamping jaw, a sliding clamping jaw, a pivoted lever within the base and cooperating with the slidable clamping jaw, a spring connection between said pivoted lever and the arm whereby when said arm is moved in one direction the slidable jaw will be forced towards the fixed jaw and a spring connected to said lever and forming means whereby when the arm is moved in the opposite direction said slidable jaw will be moved away from the fixed jaw.

3. A sawing machine comprising a base, an oscillating frame pivotally mounted on the base, a saw carried by said frame, means for rotating said saw, means for oscillating said saw frame, an automatic material clamp controlled by the saw frame oscillating means, a material stop to one side of the base and the clamp, said material stop comprising a pivoted lever, a downwardly extending member carried by the pivoted frame, said pivoted lever underlying the downwardly extending member.

4. An automatic saw comprising a counterbalanced saw carrying frame, a base, a pivotal connection between the base and the saw carrying frame, an operating arm carried by the saw carrying frame and extending downwardly and inwardly into the base, means cooperating with said operating arm for oscillating the same, a fixed clamping jaw on the base, a slidable clamping jaw on the base, a pivoted lever beneath the base, a pin carried by the slidable jaw, said pin being disposed in a bifurcation of the pivoted lever, a coiled spring connected to said pivoted lever below its pivotal point, said coiled spring being anchored to the operating arm, a coiled spring connected to the pivoted lever and anchored to the frame, said last named coiled spring forming means for imparting a pull on the pivoted lever in the direction opposed to the direction of pull of the first mentioned spring.

5. The combination with a sawing machine having a saw mounted on an oscillating frame and movable towards clamping jaws, of means controlled by the oscillating frame for clamping an article in the clamping jaws and releasing the same after a cutting operation, a stop adjacent said clamping jaws, and means controlled by the oscillating frame whereby as the saw approaches the cutting position said stop will be moved to inoperative position.

6. The combination with an oscillating saw, driving means for said oscillating saw for moving the same to operative and inoperative position, an automatically controlled clamp, a material stop to one side of the clamp and of the saw, said material stop comprising a pivoted lever movable in a vertical plane, an arm carried by the oscillating saw, said arm having an adjustable bolt to one side of the saw, said bolt being positioned in the path of one end of the stop lever.

7. The combination with an operating arm of a pivoted saw carrying frame, said frame being pivotally mounted on a base, of means for oscillating said arm, said means comprising a motor, a rotatable arm operatively connected to said motor, a gear train connection between the motor and the rotatable arm, a pin carried by said arm and disposed in an elongated slot in the operating arm and means whereby said motor and gear train may be simultaneously moved to various positions for varying the positions of the ends of the strokes of the operating arms.

8. The combination with an operating arm of a pivoted saw carrying frame, said frame being pivotally mounted on a base, of means for oscillating said operating arm, said means comprising a motor, an arm rotatably mounted, a gear train connection between the motor and the rotatable arm, a slidable connection between the rotating arm and the operating arm and means whereby said motor and gear train may be simultaneously moved to various positions for varying the positions of the ends of the strokes of the operating arm.

9. A sawing machine comprising a base, an oscillating frame pivotally mounted on the base, a saw carried by said frame, means for rotating said saw, means for oscillating said saw frame, an automatic material clamp controlled by the saw frame oscillating means, a material stop to one side of the base and clamp, a material chute between the stop and clamp, said material stop comprising a pivoted lever, a downwardly extending member carried by the pivoted frame, said pivoted lever underlying the downwardly extending member, said stop moving upwardly in relation to the chute.

In testimony whereof we hereunto affix our signatures.

OTTO FRED KLEEB.
HENRY JAMES FULLERTON.